United States Patent
Prathipati et al.

(10) Patent No.: US 12,548,945 B2
(45) Date of Patent: Feb. 10, 2026

(54) SYSTEM INCLUDING CONNECTOR BRACKET

(71) Applicant: B/E Aerospace, Inc., Winston-Salem, NC (US)

(72) Inventors: Krishna Chaitanya Prathipati, Hyderabad (IN); Shiva Shankar Madduri, Hyderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 301 days.

(21) Appl. No.: 18/135,375

(22) Filed: Apr. 17, 2023

(65) Prior Publication Data

US 2024/0006804 A1    Jan. 4, 2024

(30) Foreign Application Priority Data

Jul. 1, 2022    (IN) .............................. 202241037963

(51) Int. Cl.
*H01R 13/58* (2006.01)
*B64D 11/06* (2006.01)
(Continued)

(52) U.S. Cl.
CPC ......... *H01R 13/5804* (2013.01); *B64D 11/06* (2013.01); *H01R 13/516* (2013.01); *H02G 3/04* (2013.01)

(58) Field of Classification Search
CPC .. H01R 13/5804; H01R 13/516; H01R 13/60; H01R 13/74; B64D 11/06;
(Continued)

(56) References Cited

U.S. PATENT DOCUMENTS 3,875,710 A * 4/1975 Dawson ................. E04B 1/043
52/432
4,938,701 A * 7/1990 Heberling ............ H05K 7/1417
439/74

(Continued)

FOREIGN PATENT DOCUMENTS

CN    102612291 B    10/2015
CN    106374416 A    2/2017
(Continued)

OTHER PUBLICATIONS

Extended European Search Report dated Dec. 20, 2023; European Application No. 23181545.7.

(Continued)

*Primary Examiner* — Truc T Nguyen
(74) *Attorney, Agent, or Firm* — Suiter Swantz IP (57) ABSTRACT

A system includes a connector bracket. The connector bracket includes a first planar plate section defined by a top first planar surface, a bottom first planar surface, and first side edges, wherein the first planar plate section includes first holes extending between the top first planar surface and the bottom first planar surface. The connector bracket includes a second planar plate section defined by a top second planar surface, a bottom second planar surface, and second side edges, wherein the second planar plate section includes second holes extending between the top second planar surface and the bottom second planar surface. The connector bracket includes a groove section connected between the first planar plate section and the second planar plate section, wherein the groove section is defined by a groove that drops below the top first planar surface and the top second planar surface.

17 Claims, 11 Drawing Sheets

(51) Int. Cl.
*H01R 13/516* (2006.01)
*H02G 3/04* (2006.01)

(58) Field of Classification Search
CPC ........ B64D 11/0696; H02G 3/04; H02G 3/32; F16B 2/08; F16B 5/0685
See application file for complete search history.

(56) References Cited

U.S. PATENT DOCUMENTS

| | | | |
|---|---|---|---|
| 7,955,085 B2 | 6/2011 | Rotenberg et al. | |
| 8,770,520 B2 | 7/2014 | Robrecht et al. | |
| 10,003,298 B2* | 6/2018 | Grushkowitz | F24S 25/00 |
| 2007/0197082 A1* | 8/2007 | Zeh | E04B 2/7433 439/404 |
| 2017/0167636 A1* | 6/2017 | Witherbee | F16L 55/035 |
| 2021/0332912 A1* | 10/2021 | Rohder | H02G 3/0456 |
| 2023/0376084 A1* | 11/2023 | Kartadinata | H05K 5/0286 |
| 2024/0006804 A1* | 1/2024 | Prathipati | H02G 3/04 |

FOREIGN PATENT DOCUMENTS

| | | |
|---|---|---|
| EP | 3540883 A1 | 5/2022 |
| JP | 2000175331 A | 6/2000 |
| JP | 2010146888 A | 9/2012 |
| JP | 2019153508 A | 9/2019 |
| WO | 2022010481 A1 | 1/2022 |

OTHER PUBLICATIONS

Machine Translation of EP3540883A1, Kloft, Martin et al., Google Patents, https://patents.google.com/patent/EP3540883A1/en?oq=EP3540883A1, Printed-to-PDF on Sep. 10, 2025, 16 pages.

* cited by examiner

SYSTEM INCLUDING CONNECTOR BRACKET

CROSS-REFERENCE TO RELATED APPLICATIONS

The present application is related to and claims priority from: Indian Application Serial Number 202241037963, titled SYSTEM INCLUDING CONNECTOR BRACKET, filed Jul. 1, 2022. Indian Application Serial Number 202241037963 is herein incorporated by reference in its entirety.

BACKGROUND

Currently, it is difficult to package many metal connectors in aircraft seat assemblies while routing cables to and around the metal connectors. It is a challenge for engineers and assembly lines to route cables while maintaining a required distance from the connectors so as to prevent cables from chafing against the metal connectors. Additionally, it can be difficult to connect and/or disconnect connectors for service. Because of these challenges, engineers spend significant time packaging connectors and routing cables according to standards. These challenges are further exacerbated for electrical routings for seats with limited space for electrical routings, such as in economy, premium economy, business class, and first-class seats.

SUMMARY

In one aspect, embodiments of the inventive concepts disclosed herein are directed to a system. The system includes a connector bracket. The connector bracket includes a first planar plate section defined by a top first planar surface, a bottom first planar surface, and first side edges, wherein the first planar plate section includes first holes extending between the top first planar surface and the bottom first planar surface. The connector bracket includes a second planar plate section defined by a top second planar surface, a bottom second planar surface, and second side edges, wherein the second planar plate section includes second holes extending between the top second planar surface and the bottom second planar surface. The connector bracket includes a groove section connected between the first planar plate section and the second planar plate section, wherein the groove section is defined by a groove that drops below the top first planar surface and the top second planar surface. The top first planar surface is coplanar with the top second planar surface.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system including a connector bracket.

In some embodiments, the connector bracket is composed of plastic. In some embodiments, the connector bracket can retain connectors, and the connector bracket can be tied via at least one cable tie to a seat structure (e.g., a cable raceway) and/or cables (e.g., cable bundles) (tied on top of cable bundles) using cable ties. In some embodiments, the connector bracket may include holes (e.g., oblong slots) that can be used to hold the connectors with cable ties. In some embodiments, the connector bracket may include a groove section including a groove, whereby the groove can accommodate a cable tie that can secure the connector bracket to a structural part of the seat and/or cables. The connector bracket can make it simple to package connectors anywhere in a seat frame assembly.

In some embodiments, the connector bracket is light in weight and will not add more than negligible weight to the seat. The connector brackets can greatly reduce an amount of engineering hours needed to package connectors in seats as the bracket connector allows the connectors to be placed at many more potential locations in the seat. The connector brackets can reduce the occurrence of rejections by original equipment manufacturers (OEMs) and vendors and can reduce the occurrence of engineers and manufacturing teams having to rework electrical routings to accommodate connectors. The connector brackets can avoid the occurrence of change requests and checks performed after rework following the change requests. The connector bracket may reduce engineering and manufacturing costs for electrical routing. The connector bracket may be easy and inexpensive to manufacture and may only need a single die to make, and the connector bracket can be used on all seating products, as well as on non-seating applications. The installation of the connector brackets may be easy, such as by using cable ties, and connectors can be easily clipped or unclipped during service.

Figure 1:
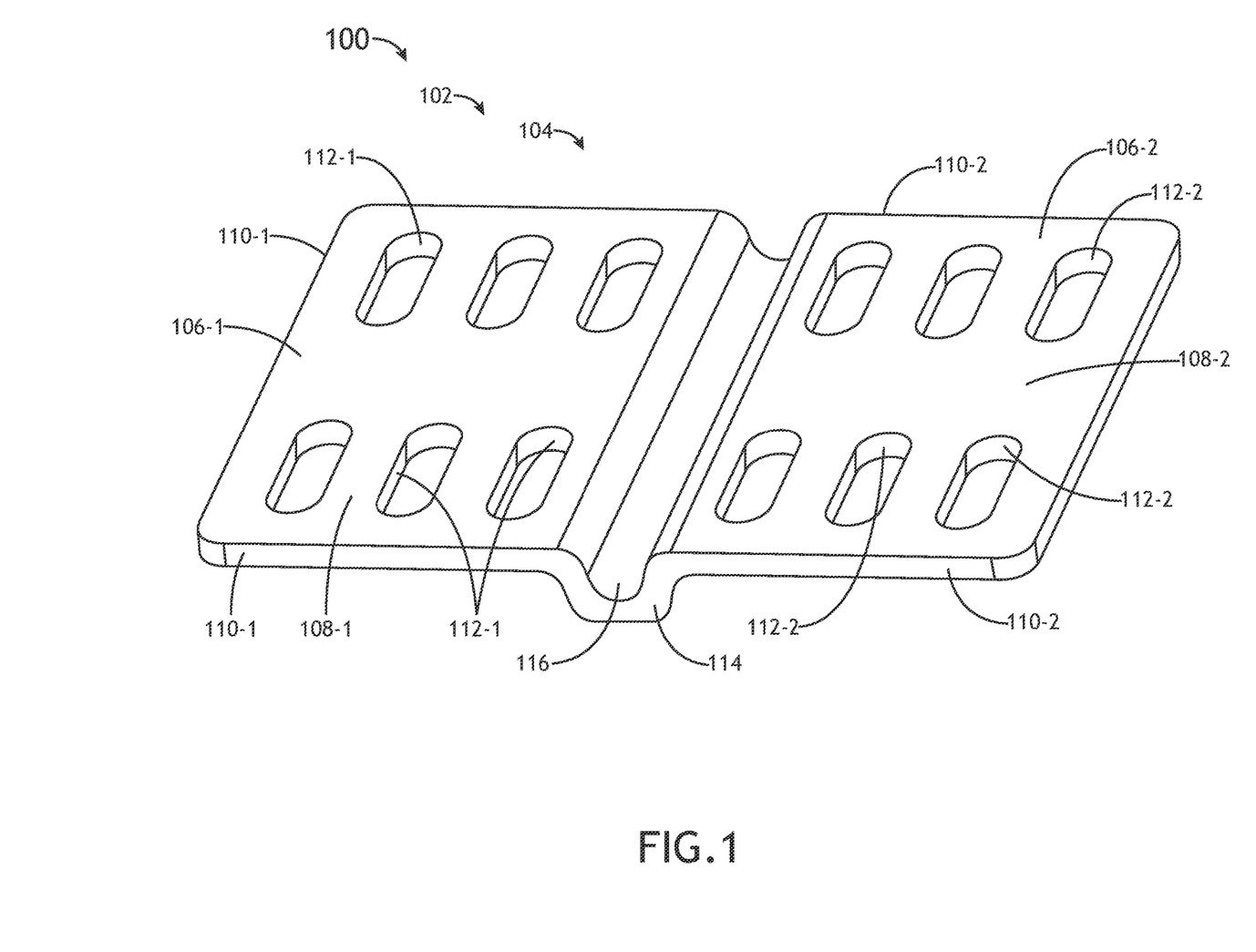
FIG. 1 is a top perspective view of an exemplary embodiment of a system including a vehicle including a connector bracket according to the inventive concepts disclosed herein.

Referring now to FIG. 1, a top perspective view of an exemplary embodiment of a system 100 including a vehicle (e.g., aircraft 102, watercraft, automobile, train, etc.) including at least one connector bracket 104 is depicted according to the inventive concepts. In some embodiments, the connector bracket may be installed within a seat frame assembly (e.g., 402; e.g., aircraft seat frame assembly); in other embodiments, the connector bracket 104 can be used for non-vehicular and/or non-seat applications and environments.

The connector bracket 104 may be made of any suitable material, such as plastic or rubber-coated metal.

Figure 3:
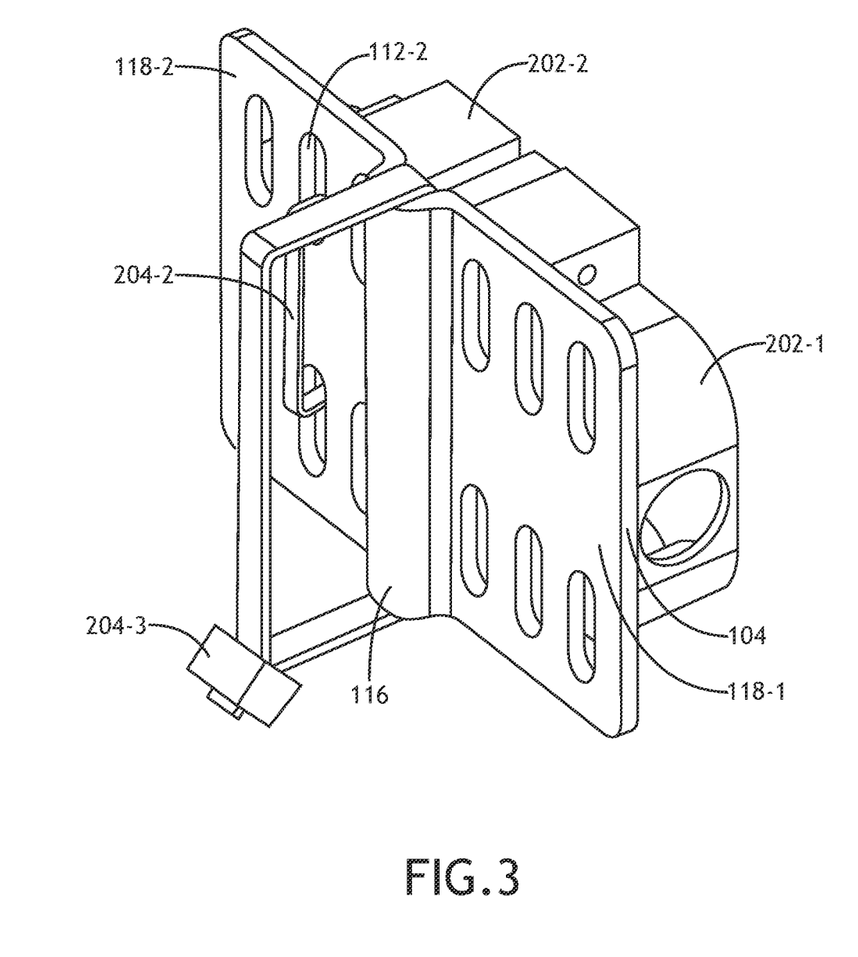
FIG. 3 is a bottom perspective view of an exemplary embodiment of the system of FIG. 2 according to the inventive concepts disclosed herein.

The connector bracket 104 may include a first planar plate section 106-1 defined by a top first planar surface 108-1, a bottom first planar surface 118-1 (as shown in FIG. 3), and first side edges 110-1. The first planar plate section 106-1 may include any number (e.g., 2, 3, 4, 5, 6, or more) of first holes 112-1 (e.g., round holes, square holes, rectangular holes, and/or oblong slots) extending between the top first planar surface 108-1 and the bottom first planar surface 118-1.

The connector bracket 104 may include a second planar plate section 106-2 defined by a top second planar surface 108-2, a bottom second planar surface 118-2 (as shown in FIG. 3), and second side edges 110-2. The second planar plate section 106-2 may include any number (e.g., 2, 3, 4, 5, 6, or more) of second holes 112-2 (e.g., round holes, square holes, rectangular holes, and/or oblong slots) extending between the top second planar surface 108-2 and the bottom second planar surface 118-2. The top first planar surface 108-1 may be coplanar with the top second planar surface 108-2. The first planar plate section 106-1 may be symmetric to the second planar plate section 106-2.

The connector bracket 104 may include a groove section 114. The groove section 114 may be connected between the first planar plate section 106-1 and the second planar plate section 106-2. The groove section may be defined by a groove 116 that drops below the top first planar surface 108-1 and the top second planar surface 108-2. In some embodiments, the groove section 114 may be defined by a groove 116 that drops below the top first planar surface 108-1, the top second planar surface 108-2, the bottom first planar surface 118-1, and the bottom second planar surface 118-2.

In some embodiments, each of the top first planar surface 108-1, the top second planar surface 108-2, the bottom first planar surface 118-1, and the bottom second planar surface 118-2 is rectangular or rectangular with at least one rounded corner.

Figure 2:
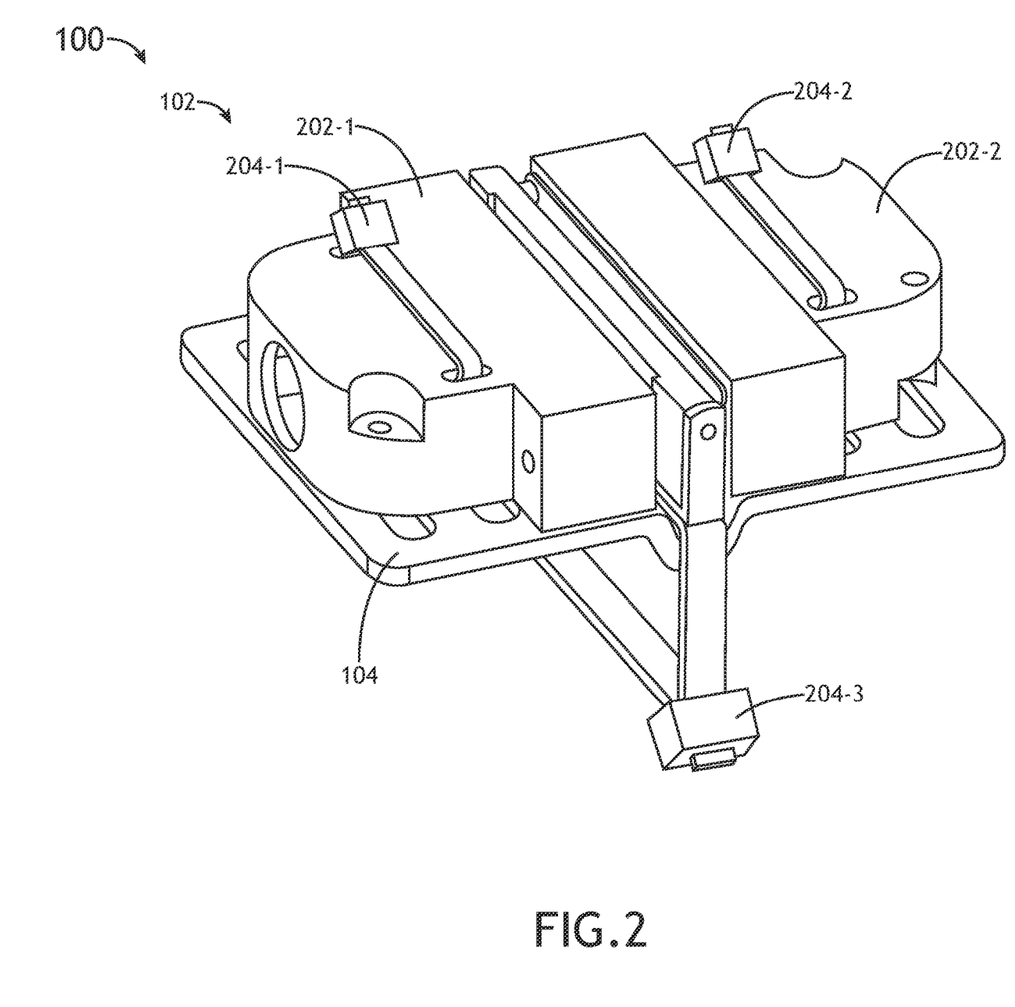
FIG. 2 is a top perspective view of an exemplary embodiment of the system of FIG. 1 including the connector bracket, connectors, and cable ties according to the inventive concepts disclosed herein.

Referring now to FIGS. 2-3, an exemplary embodiment of the system 100 of FIG. 1 is shown according to the inventive concepts. The system 100 may include the vehicle (e.g., aircraft 102, watercraft, automobile, train, etc.) including the at least one connector bracket 104, at least one connector 202-1, 202-2, and at least one cable tie 204-1, 204-2, 204-3. FIG. 2 shows a top perspective view of the at least one connector bracket 104, at least one connector 202-1, 202-2, and at least one cable tie 204-1, 204-2, 204-3. FIG. 3 shows a bottom perspective view of the at least one connector bracket 104, at least one connector 202-1, 202-2, and at least one cable tie 204-1, 204-2, 204-3.

In some embodiments, the system 100 may include a first cable connector 202-1, a first cable tie 204-1, a second cable connector 202-2, and optionally a second cable tie 204-2. The first cable connector 202-1 may be secured against the top first planar surface 108-1 by the first cable tie 204-1. The first cable tie 204-1 may pass through two or more of the first holes 112-1. Optionally, the second cable connector 202-2 may be secured against the top second planar surface 108-2 by the second cable tie 204-2 (if present). Optionally, the second cable tie 204-2 (if present) passes through two or more of the second holes 112-2. In some embodiments, the second cable connector 202-2 may be secured against the top second planar surface 108-2 by being connected to the first cable connector 202-1.

In some embodiments, the first connector 202-1 and the second connector 202-2 may be connected to each other.

Figure 4:
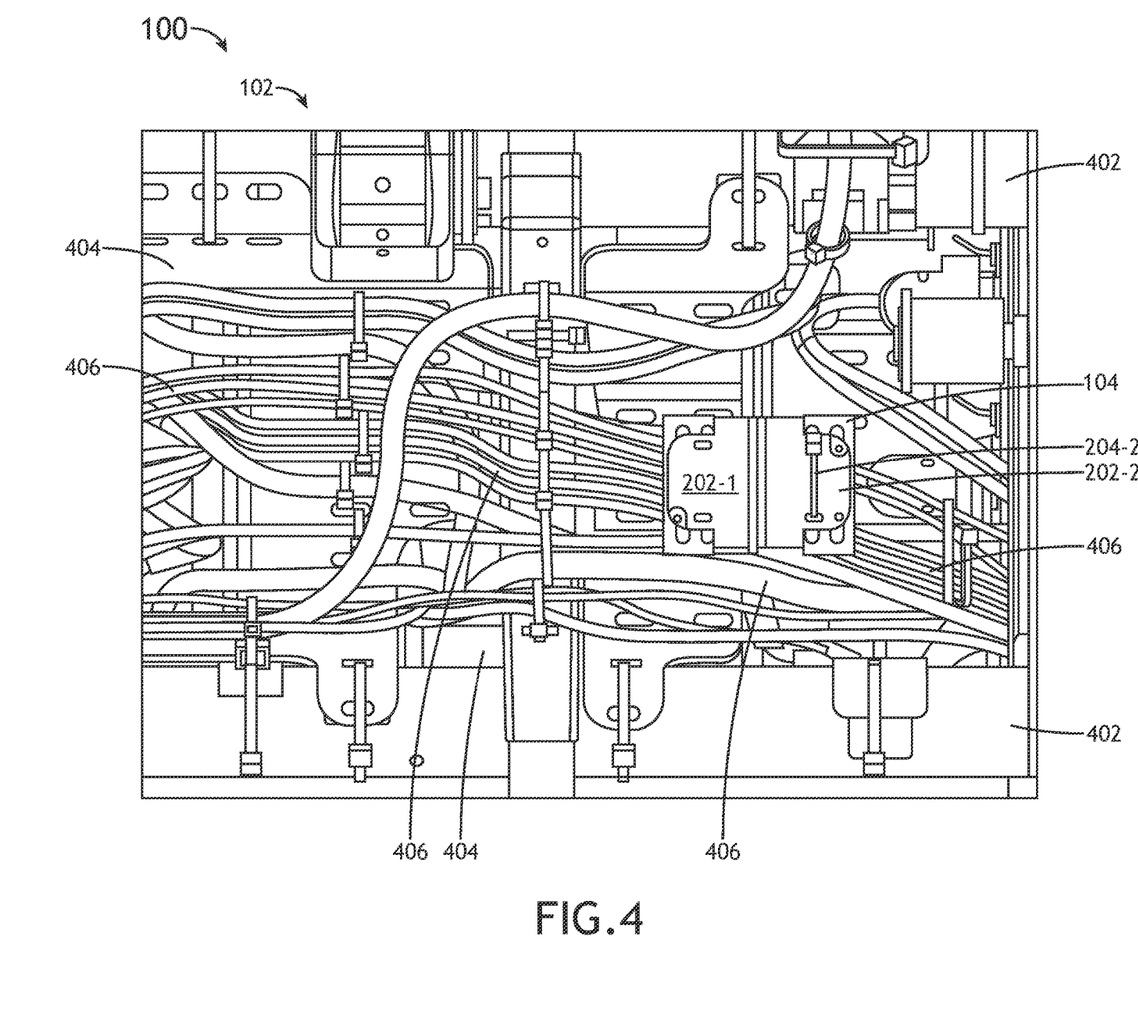
FIG. 4 is a top view of an exemplary embodiment of the system of FIG. 1 including the vehicle, a seat frame assembly, a cable raceway, cables, the connector bracket, the connectors, and the cable ties according to the inventive concepts disclosed herein.

In some embodiments, the system 100 may include a third cable tie 204-3 and at least one object (e.g., at least one of a cable raceway 404 or at least one cable 406, as shown in FIG. 4 et seq.). The connector bracket 104 may be secured to the at least one object by the third cable tie 204-3. A portion of the third cable tie 204-3 may reside in the groove 116 of the groove section 114 and may wrap around the at least one object. In some embodiments, the third cable tie 204-3 may reside in the groove 116 such that the third cable tie 204-3 is in between a bottom of the groove 116 and the top planar surfaces 108-1, 108-2 such that the third cable tie 204-3 does not interfere with the connectors 202-1, 202-2.

Referring generally now to FIGS. 4-11, exemplary embodiments of the system 100 of FIGS. 1-3 is shown according to the inventive concepts. The system 100 may include the vehicle (e.g., aircraft 102, watercraft, automobile, train, etc.) including at least one seat frame assembly 402 (e.g., a vehicle seat frame assembly, such as an aircraft seat frame assembly) including the at least one connector bracket 104, at least one connector 202-1, 202-2, at least one cable tie 204-1, 204-2, and/or 204-3, at least one cable raceway 404 (e.g., at least on seat cable raceway), and/or at least one cable 406 (e.g., at least one cable bundle).

Figure 5:
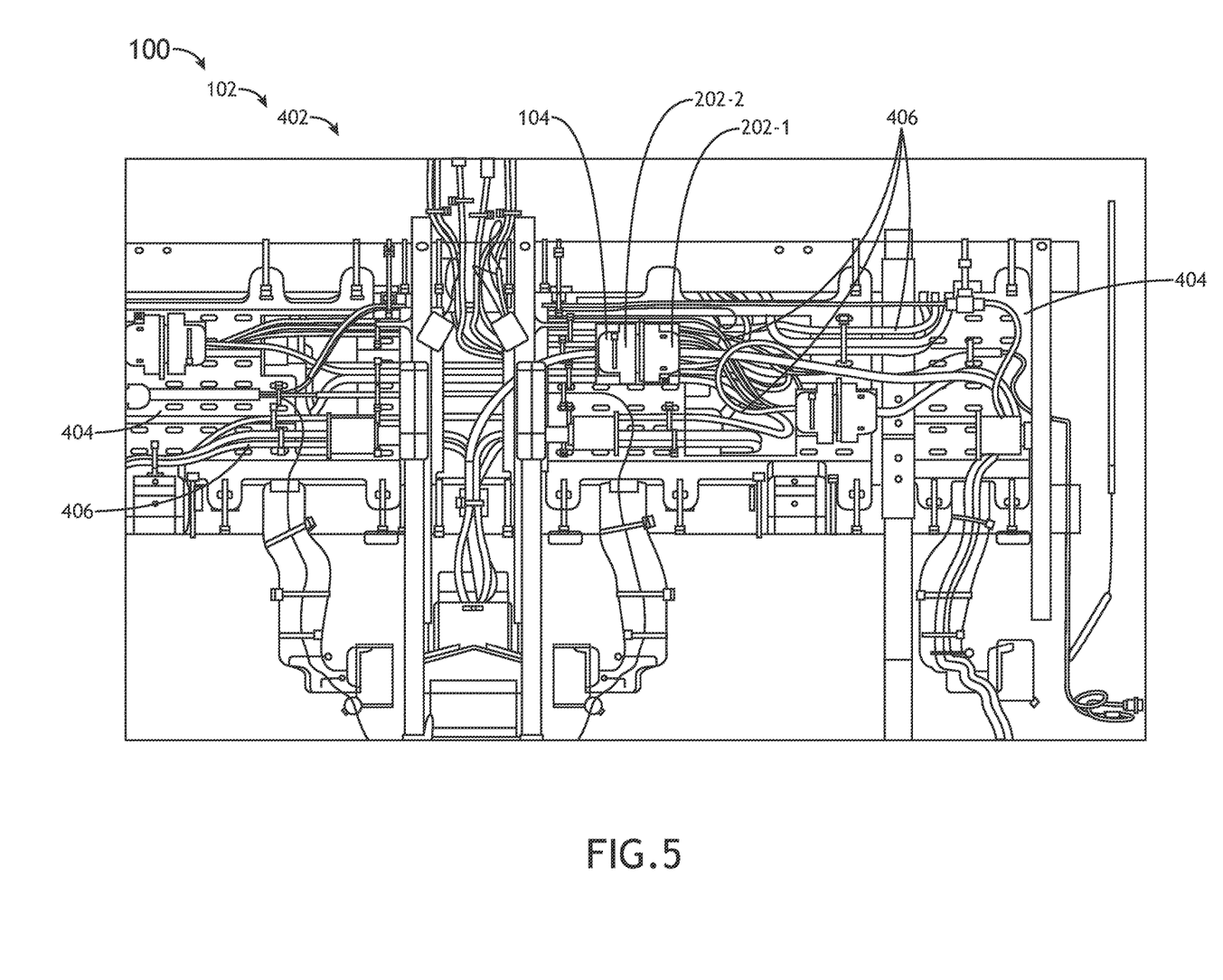
FIG. 5 is a top view of an exemplary embodiment of the system of FIG. 1 including the vehicle, a seat frame assembly, a cable raceway, cables, the connector bracket, the connectors, and the cable ties according to the inventive concepts disclosed herein.

FIGS. 4-5 show top views of exemplary embodiments including the seat frame assembly 402 including the connector bracket 104, the connectors 202-1, 202-2, cable ties 204-1, 204-2, and/or 204-3, a cable raceway 404, and cables 406.

Figure 6:
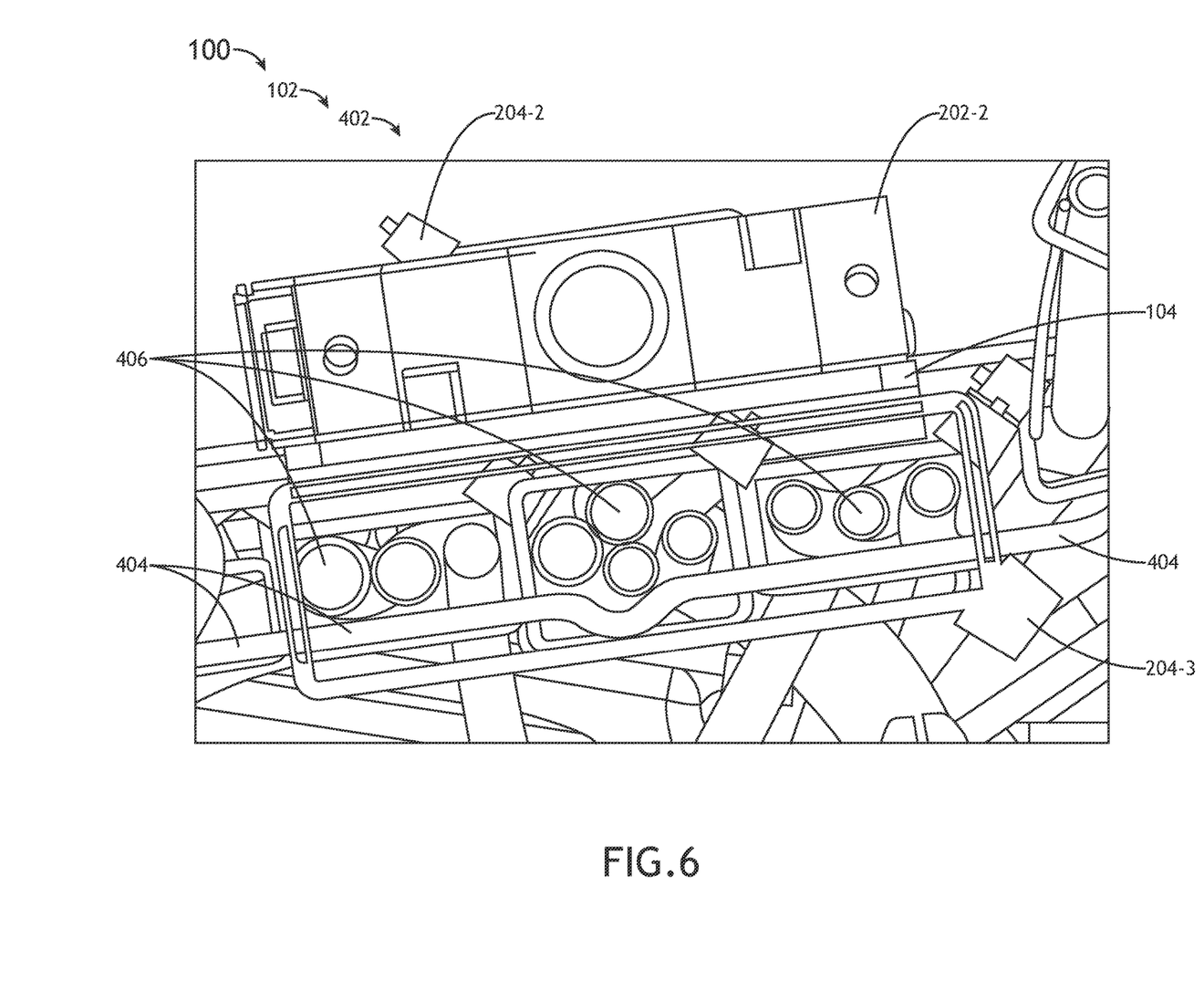
FIG. 6 is a cross-sectional view of an exemplary embodiment of the system of FIG. 1 including the vehicle, a seat frame assembly, a cable raceway, cables, the connector bracket, the connectors, and the cable ties according to the inventive concepts disclosed herein.

FIG. 6 shows a cross-sectional view of an exemplary embodiment including the seat frame assembly 402 including the connector bracket 104, the connector 202-2, cable ties 204-2 and 204-3, the cable raceway 404, and the cables 406.

Figure 7:
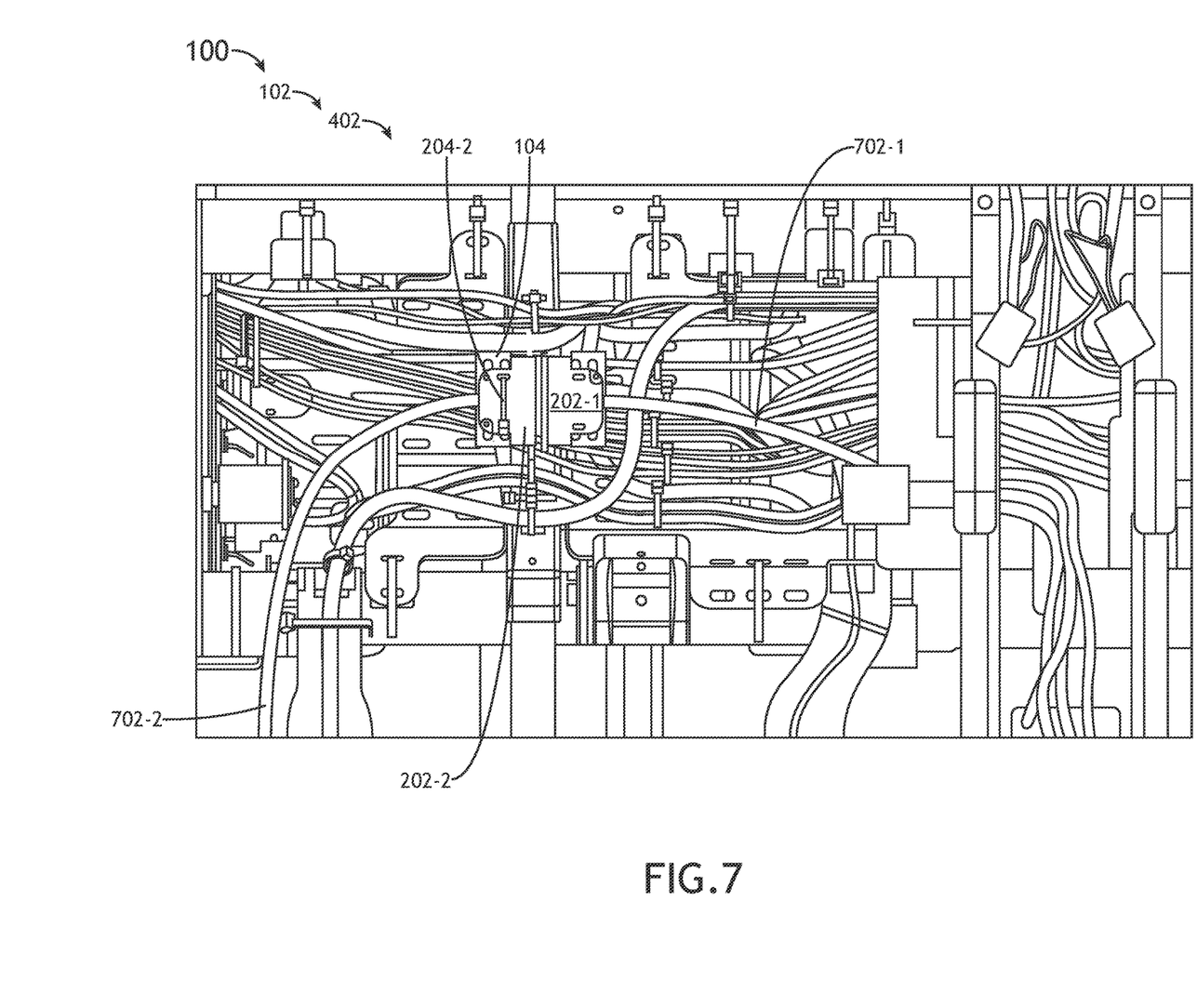
FIG. 7 is a top view of an exemplary embodiment of the system of FIG. 1 including the vehicle, a seat frame assembly, a cable raceway, cables, the connector bracket, the connectors, and the cable ties according to the inventive concepts disclosed herein.

FIG. 7 shows a top view of an exemplary embodiment including the seat frame assembly 402 including the connector bracket 104, the connectors 202-1, 202-2, cable ties 204-2 and 204-3, the cable raceway 404, the cables 406, and connector cables 702-1, 702-2. The connector cables 702-1, 702-2 may be connected to the connectors 202-1, 202-2.

Figure 8:
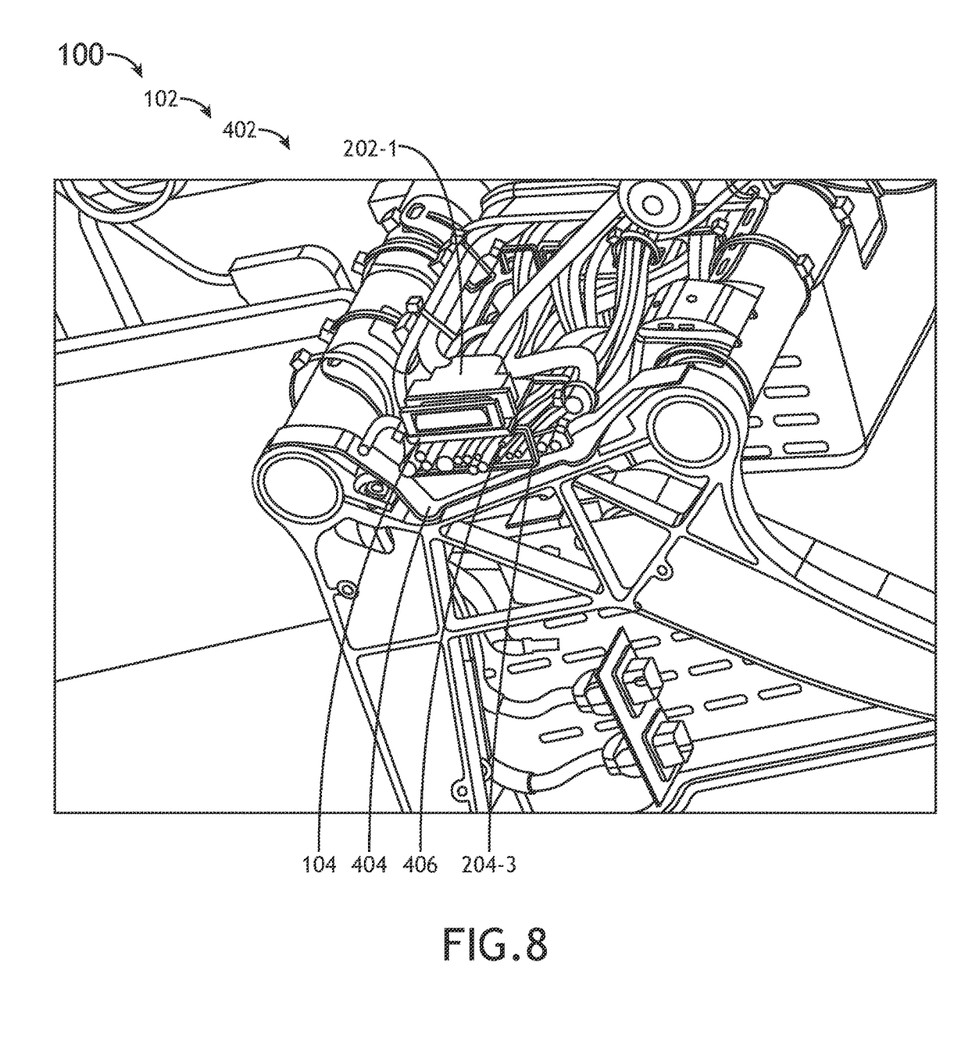
FIG. 8 is a cross-sectional view of an exemplary embodiment of the system of FIG. 1 including the vehicle, a seat frame assembly, a cable raceway, cables, the connector bracket, the connectors, and the cable ties according to the inventive concepts disclosed herein.
Figure 9:
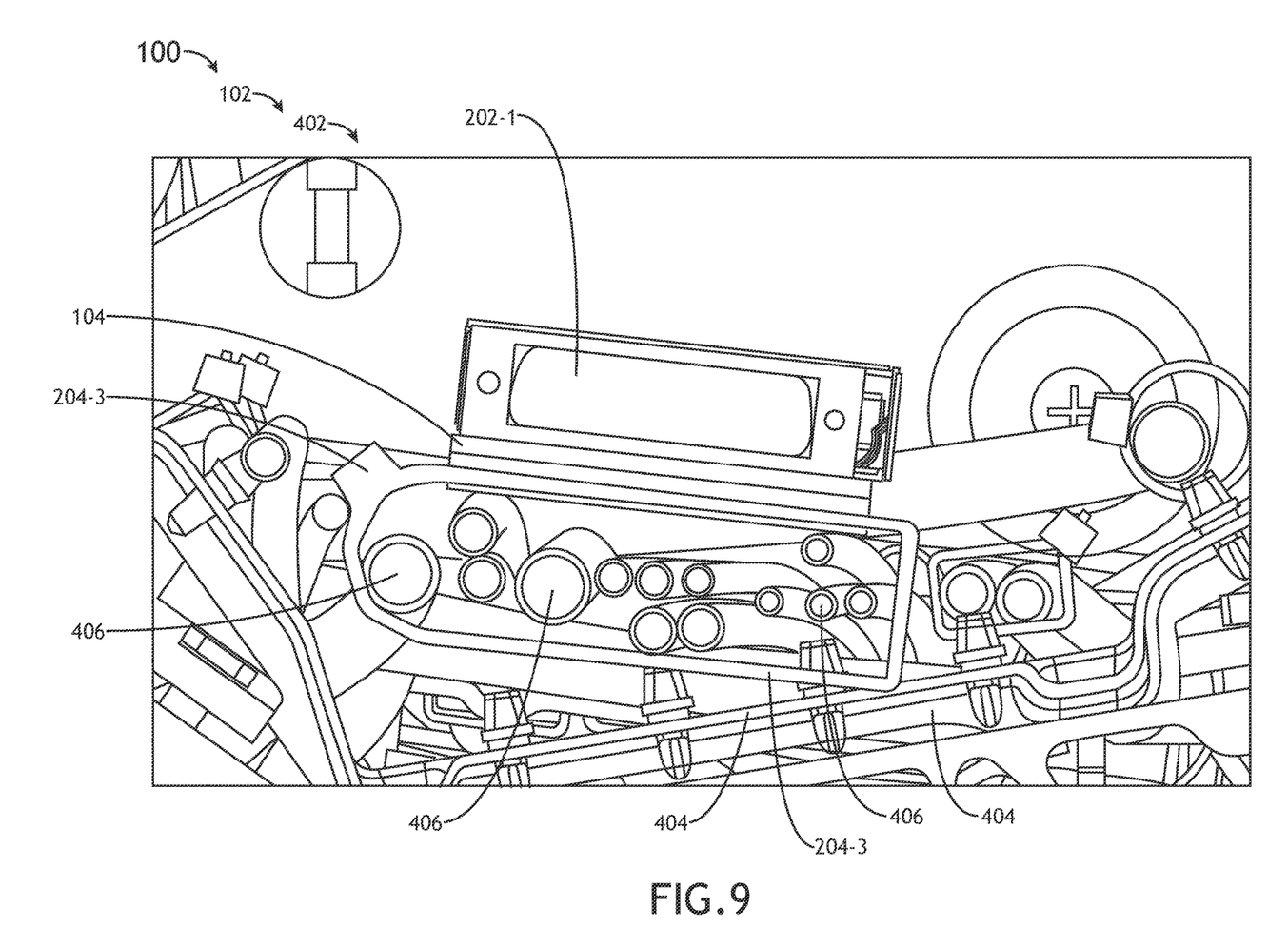
FIG. 9 is a cross-sectional view of an exemplary embodiment of the system of FIG. 1 including the vehicle, a seat frame assembly, a cable raceway, cables, the connector bracket, the connectors, and the cable ties according to the inventive concepts disclosed herein.

FIGS. 8-9 shows a cross-sectional view of an exemplary embodiment including the seat frame assembly 402 including the connector bracket 104, the connector 202-1, cable tie 204-3, the cable raceway 404, and the cables 406.

Figure 10:
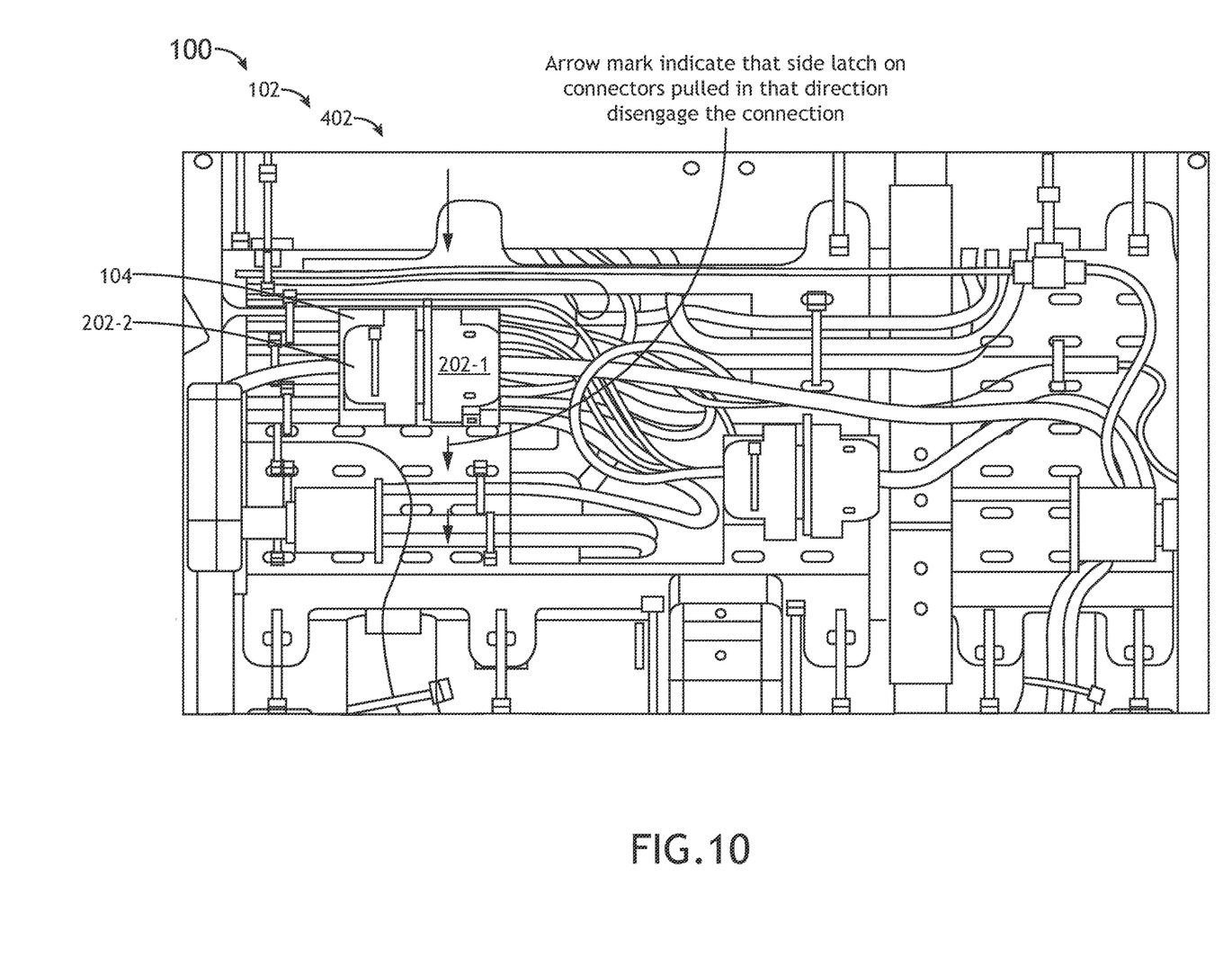
FIG. 10 is a top view of an exemplary embodiment of the system of FIG. 1 including the vehicle, a seat frame assembly, a cable raceway, cables, the connector bracket, the connectors, and the cable ties according to the inventive concepts disclosed herein.
Figure 11:
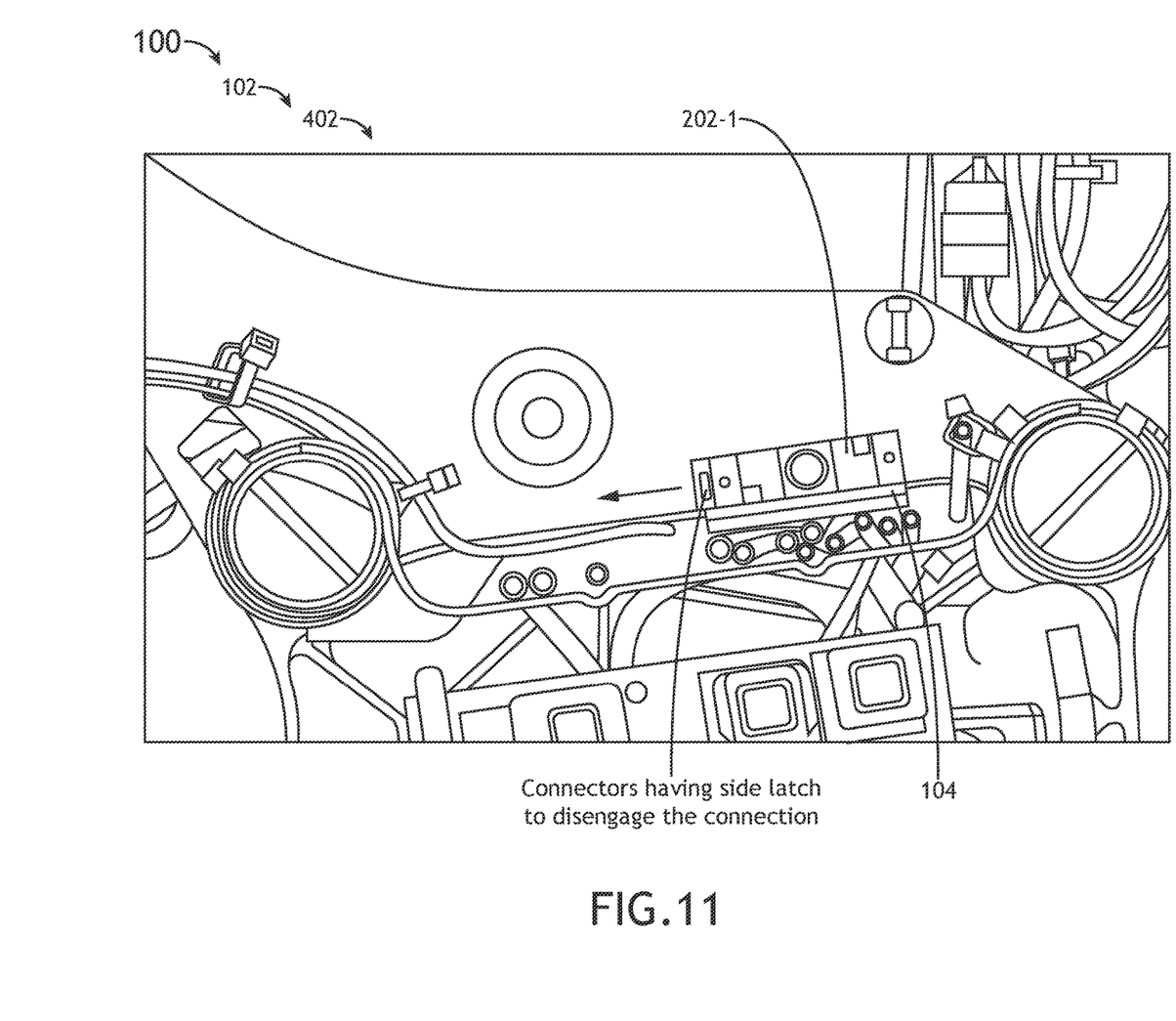
FIG. 11 is a cross-sectional view of the system of FIG. 10 according to the inventive concepts disclosed herein.

FIGS. 10-11 shows a top view and a cross-sectional view of an exemplary embodiment including the seat frame assembly 402 including the connector bracket 104, the connectors 202-1, 202-2, cable ties 204-2 and 204-3, the cable raceway 404, the cables 406, and connector cables 702-1, 702-2. As shown, the connector bracket 104 may be installed in such a way that there is sufficient clearance to disconnect the connector 202-1 and disengage the connector to the side without interfering with the cables 406.

As will be appreciated from the above, embodiments of the inventive concepts disclosed herein may be directed to a system including a connector bracket.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
 a connector bracket, comprising:
  a first planar plate section defined by a top first planar surface, a bottom first planar surface, and first side edges, wherein the first planar plate section includes first holes extending between the top first planar surface and the bottom first planar surface;
  a second planar plate section defined by a top second planar surface, a bottom second planar surface, and second side edges, wherein the second planar plate section includes second holes extending between the top second planar surface and the bottom second planar surface; and
  a groove section, the groove section connected between the first planar plate section and the second planar plate section, wherein the groove section is defined by a groove that drops below the top first planar surface and the top second planar surface, wherein the top first planar surface is coplanar with the top second planar surface;

a first cable connector;
a first cable tie;
a second cable connector;
a second cable tie;
a third cable tie; and
at least one object;

wherein the first cable connector is secured against the top first planar surface by the first cable tie, wherein the first cable tie passes through two of the first holes, wherein optionally the second cable connector is secured against the top second planar surface by the second cable tie, wherein optionally the second cable tie passes through two of the second holes;

wherein the first connector and the second connector are connected to each other;

wherein the connector bracket is secured to the at least one object by the third cable tie, wherein a portion of the third cable tie resides in the groove of the groove section and wraps around the at least one object.

2. The system of claim 1, wherein the first planar plate section is symmetric to the second planar plate section.

3. The system of claim 2, wherein the groove section is defined by a groove that drops below the top first planar surface, the top second planar surface, the bottom first planar surface, and the bottom second planar surface.

4. The system of claim 3, wherein at least one of the first holes and at least one of the second holes are oblong slots.

5. The system of claim 4, wherein there are at least four first holes and at least four second holes.

6. The system of claim 5, wherein each of the top first planar surface, the top second planar surface, the bottom first planar surface, and the bottom second planar surface is rectangular or rectangular with at least one rounded corner.

7. The system of claim 1, wherein the at least one object comprises at least one of a cable raceway or at least one cable.

8. The system of claim 7, wherein the at least one object comprises the cable raceway.

9. The system of claim 7, wherein the at least one object comprises the at least one cable.

10. The system of claim 7, wherein the at least one object comprises the cable raceway and the least one cable.

11. The system of claim 7, further comprising a seat frame assembly comprising the cable raceway and the at least one cable, wherein the cable raceway is a seat cable raceway.

12. The system of claim 11, wherein the seat frame assembly is a vehicle seat frame assembly.

13. The system of claim 12, wherein the seat frame assembly is an aircraft seat frame assembly.

14. The system of claim 13, wherein the first planar plate section is symmetric to the second planar plate section.

15. The system of claim 14, wherein the groove section is defined by a groove that drops below the top first planar surface, the top second planar surface, the bottom first planar surface, and the bottom second planar surface.

16. The system of claim 15, wherein at least one of the first holes and at least one of the second holes are oblong slots.

17. The system of claim 16, wherein there are at least four first holes and at least four second holes.

* * * * *